(12) United States Patent
Manzoor

(10) Patent No.: US 9,410,597 B2
(45) Date of Patent: Aug. 9, 2016

(54) RADIAL VIBRATION DAMPERS FOR ROTATING SHAFTS

(71) Applicant: Suhale Manzoor, Plymouth, MI (US)

(72) Inventor: Suhale Manzoor, Plymouth, MI (US)

(73) Assignee: DAYCO IP HOLDINGS, LLC, Troy, MI (US)

( * ) Notice: Subject to any disclaimer, the term of this patent is extended or adjusted under 35 U.S.C. 154(b) by 0 days.

(21) Appl. No.: 14/677,621

(22) Filed: Apr. 2, 2015

(65) Prior Publication Data

US 2015/0285329 A1    Oct. 8, 2015

Related U.S. Application Data

(60) Provisional application No. 61/974,202, filed on Apr. 2, 2014.

(51) Int. Cl.
| | |
|---|---|
| *F16F 15/12* | (2006.01) |
| *F16F 15/124* | (2006.01) |
| *F16F 15/14* | (2006.01) |

(52) U.S. Cl.
CPC .......... *F16F 15/124* (2013.01); *F16F 15/1435* (2013.01); *Y10T 74/2131* (2015.01)

(58) Field of Classification Search
CPC ... F16F 15/124; F16F 15/1435; F16F 15/126; F16F 15/1442; F16F 15/10; F16F 7/04; F16F 7/087; F16F 7/104; F16F 7/10; F16F 7/1028; Y10T 74/2131; F16H 2055/366; F16D 3/68
See application file for complete search history.

(56) References Cited

U.S. PATENT DOCUMENTS

| | | | | |
|---|---|---|---|---|
| 3,410,369 A | * | 11/1968 | Mizuro | F16F 15/1442 188/379 |
| 4,220,056 A | * | 9/1980 | Bremer, Jr. | F16F 15/1442 74/574.4 |
| 4,378,865 A | | 4/1983 | McLean | |
| 5,299,468 A | | 4/1994 | Withers | |
| 6,550,754 B2 | * | 4/2003 | Kuwayama | F16F 7/108 267/141.3 |
| 6,981,579 B2 | * | 1/2006 | Kuwayama | F16F 15/1442 188/379 |

(Continued)

OTHER PUBLICATIONS

PCT, International Search Report and Written Opinion, PCT/US2015/024014 (Jul. 7, 2015).

(Continued)

*Primary Examiner* — Adam D Rogers
(74) *Attorney, Agent, or Firm* — Thompson Hine LLP

(57) ABSTRACT

Radial vibration dampers (RVD's) press-fittable to a shaft and shaft systems incorporating RVD's are disclosed herein. The RVD's include a first inertia member and a second inertia member fixedly connected to one another to define an annular channel having a radially facing, open side and a spring damper material seated in the annular chamber and axially compressed between the two inertia members. The spring damper material has a compressible portion protruding from the radially facing, open side so that, when the compressible portion is compressed against a shaft, the spring damper material defines a gap between the shaft and the inertia members. The RVD may be press-fittable inside a hollow shaft or to the outside of a hollow or solid shaft. The RVD's disclosed herein have first vibration mode shapes that are radial in nature and decoupled from latter vibration modes.

20 Claims, 5 Drawing Sheets
(1 of 5 Drawing Sheet(s) Filed in Color)

(56) References Cited

U.S. PATENT DOCUMENTS

| | | | |
|---|---|---|---|
| 8,323,118 B2* | 12/2012 | Ikeda | F16F 15/1442 188/380 |
| 8,342,058 B2 | 1/2013 | Christenson et al. | |
| 8,397,602 B2* | 3/2013 | Christenson | F16F 15/126 74/574.4 |
| 2009/0000421 A1 | 1/2009 | Christenson et al. | |
| 2009/0000422 A1 | 1/2009 | Christenson et al. | |
| 2014/0315648 A1* | 10/2014 | Manzoor | F16F 15/1201 464/180 |

OTHER PUBLICATIONS

Acoustical Engineering: Noise Control and Vibration Abatement; "What is Vibration Modal and Fatigue Analysis?"; HGC Engineering; Howe Gastmeier Chapnik Limited (earliest access date according to Wayback Machine Internet Archive Engine Aug. 12, 2012).

* cited by examiner

Mode 1:
Radial 135 Hz

Mode 2:
Axial 199 Hz

Mode 3:
Torsional 201 Hz

Mode 4:
Conical 214 Hz

US 9,410,597 B2

RADIAL VIBRATION DAMPERS FOR ROTATING SHAFTS

RELATED APPLICATIONS

This application claims the benefit of U.S. Provisional Application No. 61/974,202, filed Apr. 2, 2014, which is incorporated by reference herein in its entirety.

TECHNICAL FIELD

The present invention relates to radial vibration dampers, more particularly, to radial vibration dampers press-fittable to shafts such as, but not limited to, drive-shafts, prop-shafts, and half-shafts.

BACKGROUND

Radial vibration dampers are used to reduce radial vibrations in rotating shaft systems. radial vibration dampers can be mounted internally or externally relative to the shaft. The most desirable radial vibration damper for inside a hollow shaft is one that has its first mode shape being radial in nature while being sufficiently decoupled from latter modes. The device must also be easy to insert into the shaft at a designated axial location, and hold its position throughout its operating life. Such a radial vibration damper is typically expensive because the construction is complex and it is unrealistic to invest in expensive injection molds for smaller production runs.

An additional problem encountered while assembling these devices is that the inner diameter of the hollow shaft that receives them generally has loose tolerances that do not allow a robust metal-to-metal press-fit.

SUMMARY

The present disclosure is directed to radial vibration dampers that are simpler in construction and eliminate the need for the expensive rubber to metal mold-bonded parts as present in commercially available radial vibration dampers. According to one aspect, a radial vibration damper is disclosed that includes a first inertia member and a second inertia member fixedly connected to one another to define an annular channel having a radially facing, open side. A spring damper material is seated in the annular channel in axial compression between the first inertia member and the second inertia member, and the spring damper material has a compressible portion thereof protruding from the radially facing, open side a sufficient distance that, once the compressible portion is compressed against a shaft, the spring damper material defines a gap between the shaft and the first and second inertia members. In another aspect, the radial vibration damper further includes a fastener connecting the first inertia member to the second inertia member.

According to another aspect of the previous embodiments, the spring damper material includes a first rib protruding therefrom compressed by contact with the first inertia member and a second rib protruding therefrom compressed by contact with the second inertia member. In another aspect of the previous embodiments, the spring damper material includes a main body between the first rib and the second rib that includes a stiffness portion and the compressible portion, wherein the compressible portion is more proximal to the radially facing, open side of the annular channel. In another aspect, the first inertia member and the second inertia member each include a groove shaped and sized to receive the first rib and the second rib, respectively, of the spring damper material. In another aspect, the first inertia member and the second inertia member each include an alignment fixture to hold the spring damper material in its position.

In another aspect of the previous embodiments, the spring damper material of the radial vibration damper includes a compressible material in at least the first rib, the second rib, and the compressible portion. The compressible material includes one or more of an elastomeric material, a hyperfoam material, and a nylon. The stiffness portion includes one or more of the same materials as the compressible portion but has a higher modulus. In another aspect, the spring damper material is a monolithic body.

In another aspect of the previous embodiments, the spring damper material of the radial vibration damper comprises a main body defined by a first ring of a compressible material in contact with a surface of the shaft, a second ring of a stiffness material seated adjacent to the first ring, a third ring compressed between the main body and the first inertia member, and a fourth ring compressed between the main body and the second inertia member.

In another aspect of the previous embodiments, the radial vibration damper has a first mode shape of vibration that is radial. In another aspect, the first mode shape of vibration is decoupled from a second mode of vibration.

In another aspect of the previous embodiments, the radial vibration damper is press-fittable into a hollow shaft with the compressible portion of the spring damper material compressed against an inner surface of the hollow shaft. In another aspect, the radial vibration damper is press-fittable over a shaft with the compressible portion of the spring damper material compressed against an exterior surface of the shaft.

A system is also disclosed that includes a shaft having press-fit thereto a radial vibration damper according to any of the previous embodiments.

BRIEF DESCRIPTION OF DRAWINGS

The patent or application file contains at least one drawing executed in color. Copies of this patent or patent application publication with color drawing(s) will be provided by the Office upon request and payment of the necessary fee.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
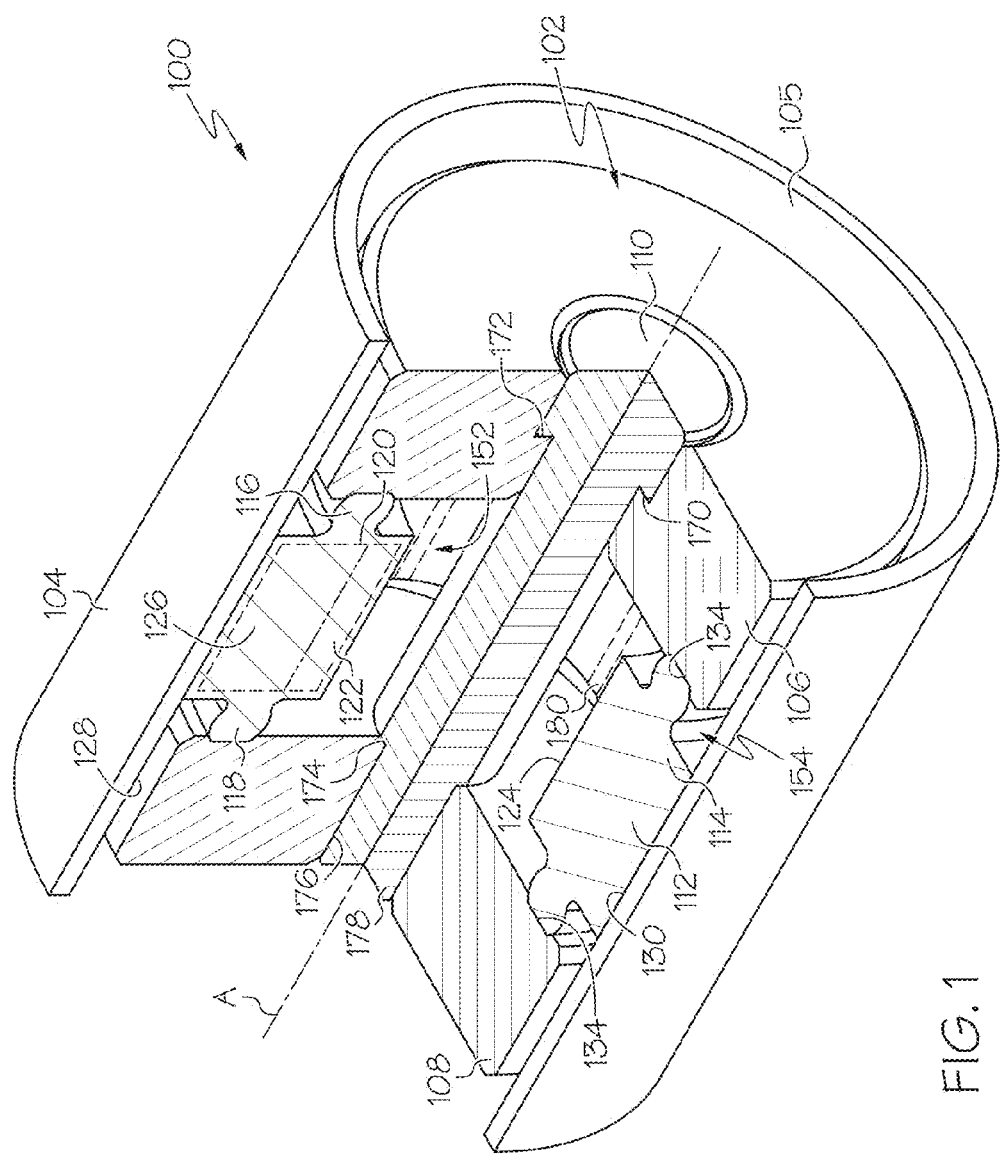
FIG. 1 is a side perspective view, with a portion cut away, of a radial vibration damper seated within a hollow shaft.

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 3:
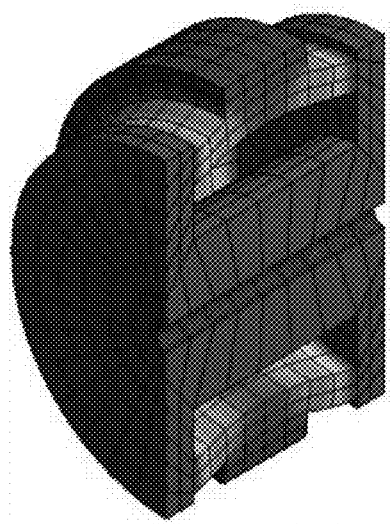
FIG. 3 is a grid showing four Modal responses, in color, of the radial vibration damper of FIG. 1 as modeled using finite element modeling.
Figure 3:
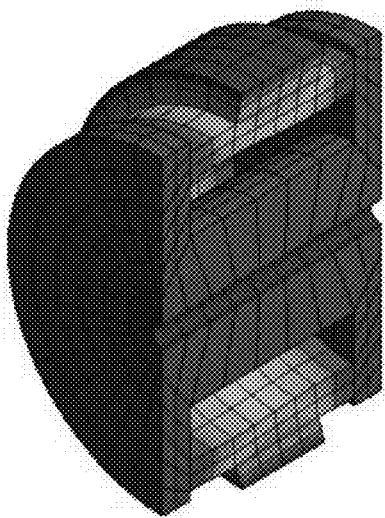
Figure 3:
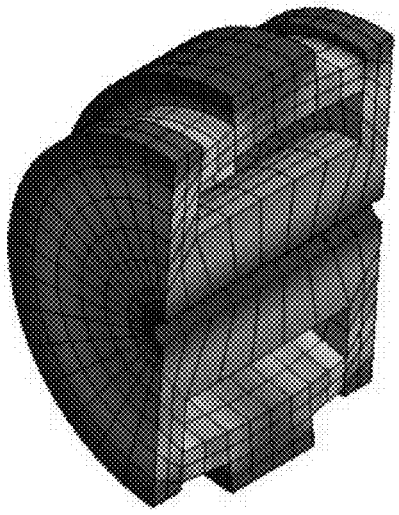
Figure 3:
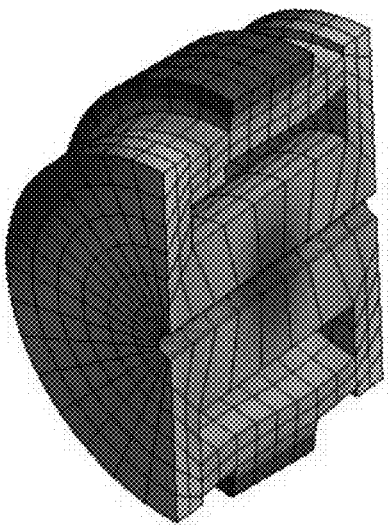

Referring now to FIG. 1, an example of one embodiment of a system 100 that includes a hollow shaft 104 with radial vibration damper 102 press fit therein is shown. The hollow shaft 104 may be any shaft intended to rotate during use, such as a drive shaft, prop-shaft, half-shafts, or the like used in automotive applications, but is not limited thereto. As seen in FIG. 3, the results of finite element modeling demonstrate that the radial vibration damper 102 has a first mode of vibration that is radial in shape with sufficient separation between the first mode and the second mode of vibration, which in this illustration is axial (known as modal decoupling). In FIG. 3, the color scale correlates color along the visible spectrum with the magnitude of the stress experienced at specific locations within the radial vibration damper 102, with red tones representing the largest magnitude values and violet tones representing the smallest magnitude values. The radial vibration damper 102 may be tuned to have a modal decoupling of 20 Hz or greater (a generally accepted industrial standard) by changing various parameters of the radial vibration damper 102, which will be better understood after an explanation of the structure of the damper itself.

Figure 2:
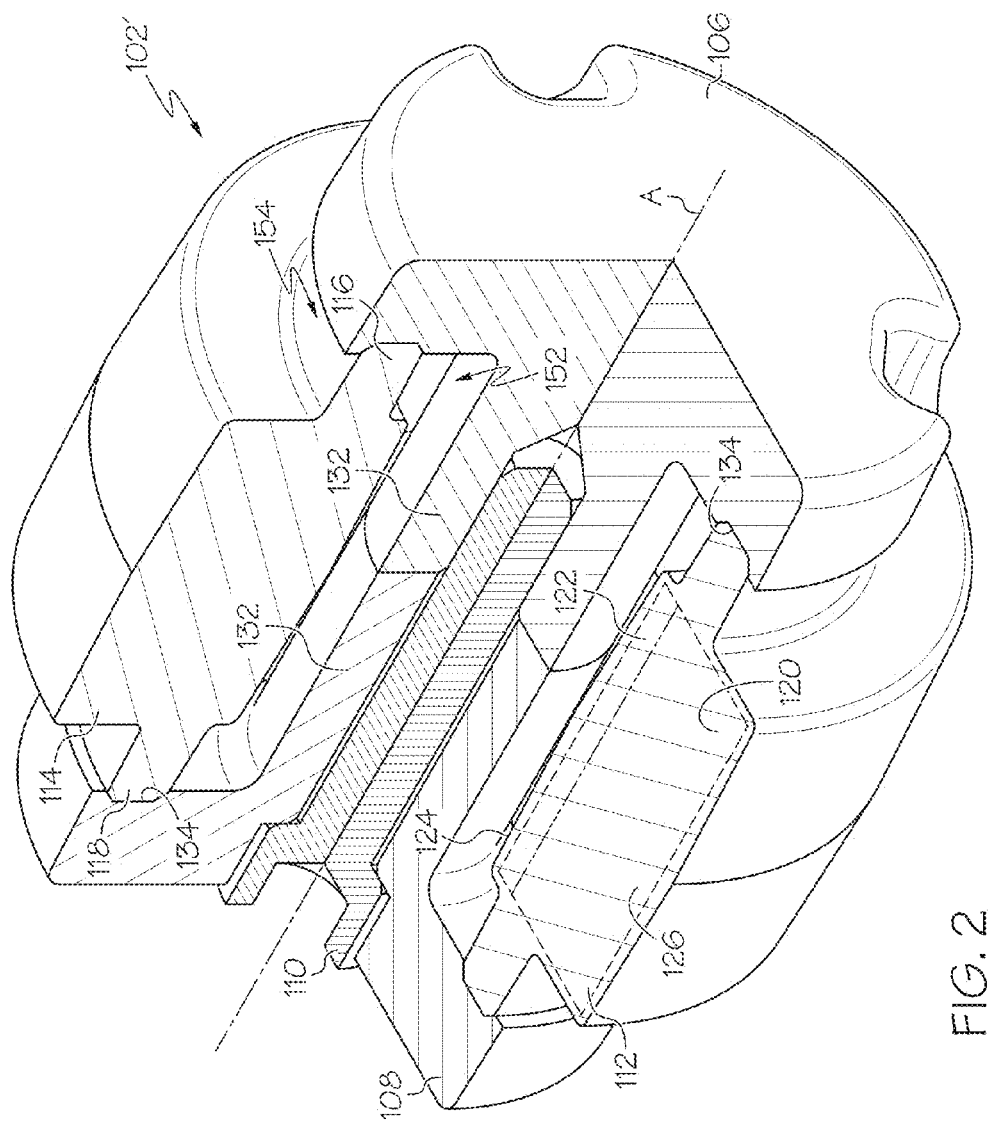
FIG. 2 is a side perspective view, with a portion cut away, of a second embodiment of a radial vibration damper.

Two embodiments of a radial vibration damper, generally designated by reference 102 are provided in FIGS. 1 and 2. As explained above, the radial vibration dampers 102, 102' are press-fittable into a hollow shaft 104. The radial vibration dampers 102, 102' both include a first inertia member 106 and a second inertia member 108 fixedly connected to one another, thereby defining a central longitudinal axis A and an annular channel 152 having at least one radially facing open side 154, which faces radially outward towards an inner surface 105 of a hollow shaft 104 for a radial vibration damper 102, 102' press-fit to the inside of the hollow shaft 104. The first and second inertia members 106, 108 may define an annular channel 152 that extends part-way, in the radial direction, between the first and second inertia members 106, 108. The first and second inertia members 106, 108 may also define an annular channel 152 that extends radially all the way between the first and second inertia members 106, 108. A spring damper material 112 is disposed at least partially within the annular channel 152 and is axially compressed between the first inertia member 106 and the second inertia member 108.

The spring damper material 112 is an annular body disposed about the central longitudinal axis A at a position that places a compressible portion 114 of the spring damper material 112 beyond the outer diameter of the first inertia member 106 and the second inertia member 108, which places at least part of the compressible portion 114 outside of the annular channel 152. Described another way, the compressible portion 114 of the spring damper material 112 extends from the annular channel 152, through the radially facing open side 154, and into contact with the inner surface 105 of the hollow shaft 104. The annular body of the spring damper material 112 also includes a first rib 116 protruding therefrom compressed by contact with the first inertia member 106 and a second rib 118 protruding therefrom compressed by contact with the second inertia member 108. The first rib 116 and second rib 118 extend axially from opposing sides of the spring damper material 112.

As represented by dashed lines in FIGS. 1 and 2, the annular body of the spring damper material 112 includes a main body 120 between the first rib 116 and the second rib 118 that includes a stiffness portion 122 more proximate an inner surface 124 thereof and the compressible portion 126. The stiffness portion 122 enables the compression portion 126 to be compressed against an inner surface 105 of a hollow shaft 104 (FIG. 1) for a press-fit. More particularly, the stiffness portion 122 provides a hydrostatic radial force to define a joint 130 between the compressible portion 126 and the inner surface 105 of the hollow shaft 104 and the compressible portion 126 has a coefficient of friction, which, combined, hold the radial vibration damper 102 in place within the hollow shaft 104 without axial movement (creep). The outer diameters of the first inertia member 106 and second inertia member 108 are generally less than a diameter of the inner surface 105 of the hollow shaft 104 such that when radial vibration damper 102 is press fit into the hollow shaft 104, which compresses the compressible portion 126 against the inner surface 105 of the shaft 104, the spring damper material 112 defines a gap 128 between the first and second inertia members 106, 108 and the inner surface 105 of the hollow shaft 104. This gap 128 allows some amount of movement of the first and second inertia members 106, 108 relative to the rotation of the hollow shaft 104.

Figure 5:
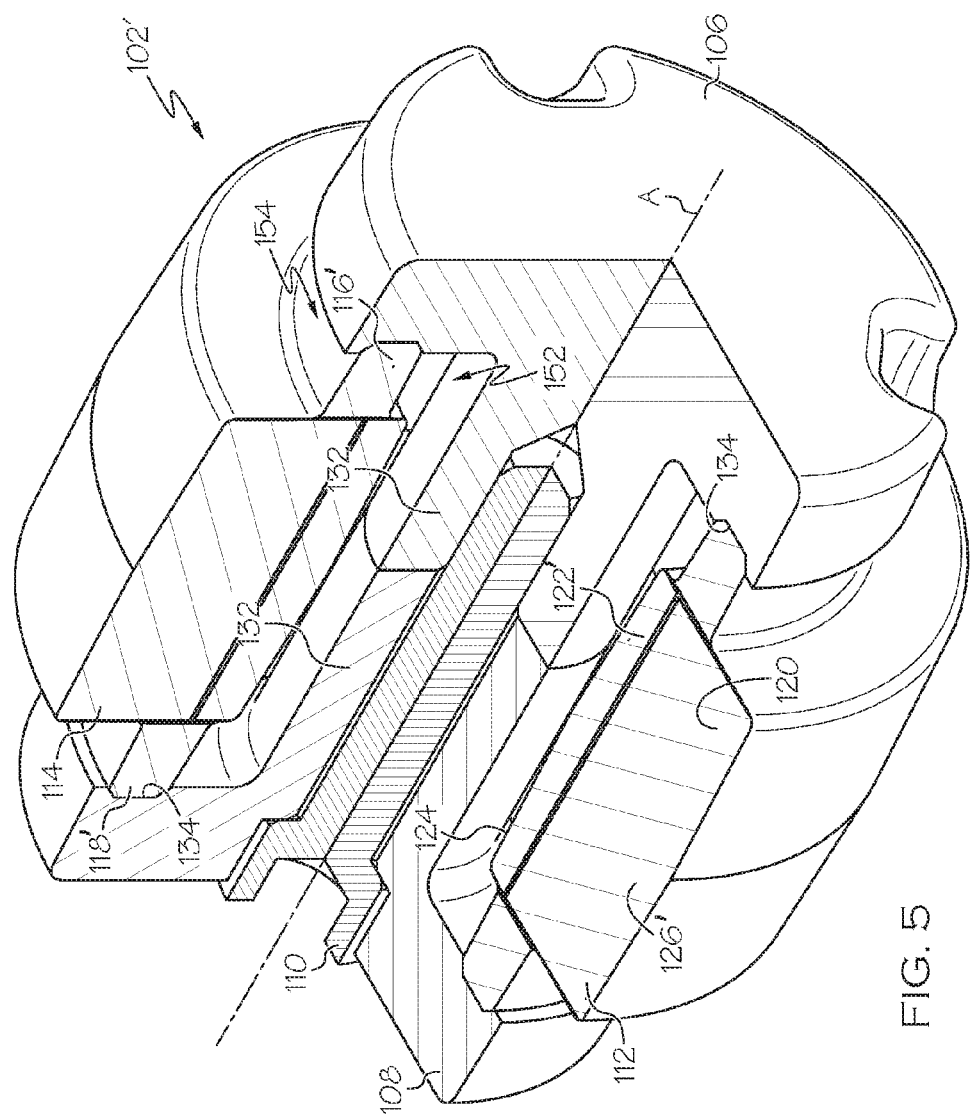
FIG. 5 is a side perspective view, with a portion cut away, of a fourth embodiment of a radial vibration damper.

As seen in FIGS. 1 and 2, the spring damper material 112 may be a monolithic body. However, in an alternate embodiment, shown FIG. 5, the spring damper material 112 may be made up of multiple parts including any one or more of the following: (1) a main body 120 having a stiffness portion and a compressible portion as a single unit or, alternately, defined by a first ring 122' of stiffness providing material having a second ring 126' seated thereabout that includes a compressible material (or a plurality of either of such rings), (2) a compressible ring 116' (in place of the first rib 116 of FIG. 2) compressed between the main body 120 and the first inertia member 106 (or a plurality of such rings), and (3) a second compressible ring 118' (in place of the second rib 118 of FIG.2) compressed between the main body 120 and the second inertia member 108 (or a plurality of such rings).

In FIGS. 1 and 2, the main body 120 is shown as being generally toroidally-shaped, in particular as a rectangular toroid body, but is not limited thereto. In other embodiments, the main body may have a trapezoidal, a circular, or any other acceptable shaped transverse cross-section.

Still referring to FIGS. 1 and 2, the spring damper material 112 includes a compressible material in at least the first rib 116, the second rib 118, and the compressible portion 126. The compressible material includes one or more of an elastomeric material, a hyperfoam material, and a nylon. Each of these materials may be any such materials that are suitable to absorb and/or damp the vibrations generated by the shaft and can withstand the general conditions experienced by the shaft such as temperature changes, road conditions, etc. The elastomeric material may be or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polycholoroprene rubber. One example of an ethylene acrylic elastomer is VAMAC® ethylene acrylic elastomer from E. I. du Pont de Nemours and Company. The hyperfoam material may be or include one or more of micro cellular urethane, sponge, or the like. The nylon may be or include nylon 6, nylon 6/6, or the like. The spring damper material 112 may be a composite that optionally includes a plurality of fibers dispersed therein. The fibers may be continuous or fragmented (chopped) aramid fibers like the fibers sold under the name TECHNORA® fiber and/or carbon fibers, for example.

The spring damper material 112 also includes the stiffness portion 122, which may be or include one or more of the materials listed above for the compressible portion 126 and/or the ribs 116, 118, but have a higher modulus than the material selected for at least one of the first and second ribs 116, 118 and the compressible portion 126.

As seen in FIGS. 1 and 2, a fastener 110 may be used to fixedly connect the first inertia member 106 to the second inertia member 108 (and vice versa). The fastener 110 may be a bolt, screw, rivet, or the like. As shown in FIG. 1, the fastener is a shoulder bolt having a first shoulder 170 seated against a stop 172 in the first inertia member 106 and a second shoulder 174 seated against the second inertia member 108. The second shoulder 174 is positioned at a distance from the first shoulder 170 that defines the amount of axial compression applied to the spring damper material 112. This distance is adjustable to change the amount of axial compression. One of the first and second inertia members 106, 108 includes a threaded bore 176 when the shoulder bolt has a threaded end 178. The fasteners 110 may be such that a head portion, if present, is counter-bored into one of the inertia member 106, 108.

In the embodiment of FIG. 2, rather than having the fastener 110 control the distance defining the axial compression of the spring damper material 112, one or more of the first and second inertia members 106, 108 may include an arm 132 extending toward the other inertia member when fixedly connected thereto that defines the distance the inertia members will remain from one another and thereby define the axial compression of the spring damper material 112. In FIG. 2, both the first inertia member 106 and the second inertia member 108 include an arm 132 that are mateable with one another. When viewed in a longitudinal cross-section the inertia members are generally T-shaped when the arms 132 are present. In FIG. 2, the first and second inertia member 106, 108 are still fixedly connected by a fastener 110, but the fastener could be omitted if the arm 132 of one of the inertia members, 106, 108 terminated with a male member and the other terminated with a female member that were mateable together with a secure connection, such as, but not limited to, a press-fit. In another embodiment (not shown), only one of the first and second inertia members 106, 108 may have an arm 132 extending therefrom and ending in a male fitting, which may be press fit with a female fitting disposed in the other of the first or second inertia members 106, 108. In another embodiment, the first and second inertia members 106, 108 may each have multiple arms 132 distributed radially to maintain a balanced shaft system 100.

Referring to both FIG. 1 and FIG. 2, the first and second inertia members 106, 108 may be made from any material having a sufficient mass, usually a cast iron metal, and may be cast, spun, forged, machined, or molded using known or hereinafter developed techniques. The first and second inertia members 106, 108 may include a groove 134 shaped and sized to receive the first rib 116 and the second rib 118, respectively therein, in a surface thereof that is facing the spring damper material 112. Since the ribs are annular rings disposed about the central longitudinal axis A, the grooves 134 are likewise annular rings disposed about the central longitudinal axis. The first rib 116 and the second rib 118 may be continuous or discontinuous rings and likewise the grooves 134 may be continuous or discontinuous rings. The grooves 134 act to position the spring damper material 112 in a predetermined position, determined to be appropriate to form the joint 130 (FIG. 1). In another embodiment, in addition to the grooves 134 or as an alternative to the grooves 134, the first inertia member 106 and/or the second inertia member 108 may include an alignment fixture 180 (FIG. 1) that protrudes therefrom toward the spring damper material 112 and at least a portion of the alignment fixture is juxtaposed to the spring damper material 112 or could be inserted into the spring damper material 112 (not shown).

The radial vibration dampers 102, 102' may be tuned by changing the mass of the first and second inertia members, by changing the geometry of the first and second ribs 116, 118 individually or collectively, changing the thickness of the stiffness portion 122, changing the compressible nature of the first and second ribs 116, 118 and/or the compressible portion 126, and/or changing the distance of separation between the first and second inertia members 106, 108 thereby changing the axial compression of the spring damper material.

The radial vibration dampers 102, 102' disclosed herein provide a radial vibration damper with a first mode of vibration that is purely radial in character and adequately separated from subsequent vibration modes. The radial vibration dampers 102, 102' disclosed herein also involve fewer parts and eliminates the need for over-molding and mold-bonding processes for constructing the elastomeric parts. This results in reducing manufacturing costs and easier installation, among other benefits.

Figure 4:
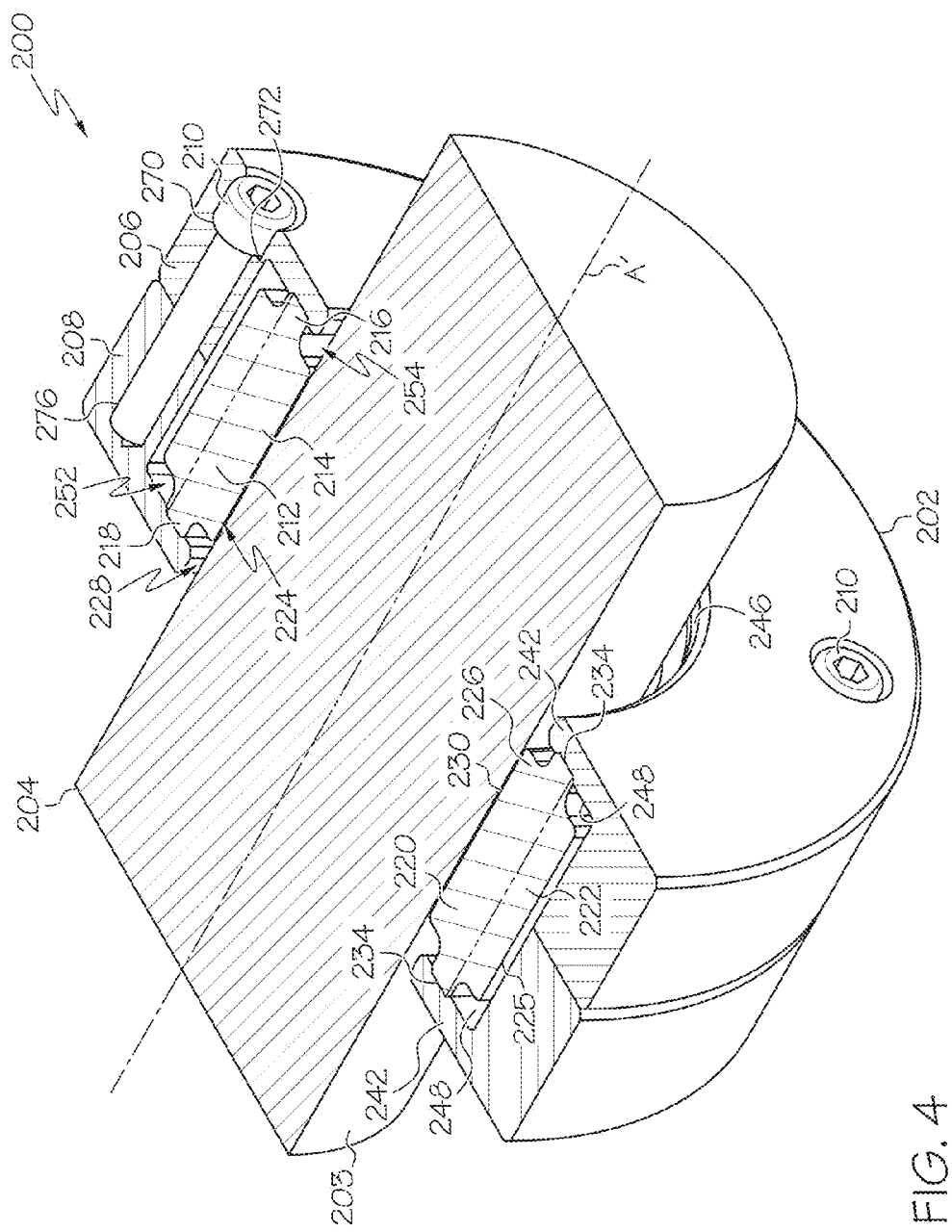
FIG. 4 is a perspective longitudinal cross-sectional view of a third embodiment of a radial vibration damper, seated about the outside of a shaft.

Referring now to FIG. 4, an example of a system 200 is illustrated that includes a shaft 204 with a radial vibration damper 202 press-fit thereon (i.e. disposed about the shaft). In system 200, the shaft 204 may be either solid or hollow, and the radial vibration damper 202 is press-fittable to an outer, exterior surface 203 of the shaft 204. The radial vibration damper 202 includes a first inertia member 206 and a second inertia member 208 fixedly connected to one another, thereby defining a central longitudinal axis A' and an annular channel 252 having at least one radially facing open side 254, which faces radially inward towards the shaft for a radial vibration damper 202 press-fit to an exterior surface 203 of a shaft 204. The first and second inertia members 206, 208 may define an annular channel 252 to extend part-way, in the radial direction, between the first and second inertia members 206, 208. The first and second inertia members 252 may alternatively define an annular channel 252 to extend radially all the way between the first and second inertia members 252. A spring damper material 212 is disposed at least partially within the annular channel 252 and is axially compressed between the first inertia member 206 and the second inertia member 208. The central longitudinal axis A' may generally coincide with an axis B of rotation of the shaft 204.

As shown in FIG. 4, the first inertia member 206 and the second inertia member 208 are generally annular in shape and each has an inner radial surface 246 that has a diameter generally greater than a diameter of the exterior surface 203 of the shaft 204. Each of the first and second inertia members 206, 208 may be characterized as having a flange portion 242 extending radially inward and terminating in the inner radial surface 246 of the first or second inertia members 206, 208. The flange portions 242 of the first and second inertia members 206, 208 have inner axial faces 248 that define axial boundaries of the annular channel 252, which is defined having the radially facing, open side 254 oriented radially inward toward central longitudinal axis A'. With the flange portions 242 extending therefrom, each of the first and second inertia members 206, 208 may have a longitudinal cross-section that is generally L-shaped, and the longitudinal cross-section of the first inertia member 206 may be a mirror image thereof. In one embodiment (not shown), the first and second inertia members 206, 208 may be annular discs having inner axial faces which define an annular channel 252 extending therebetween along the entire radial distance between the first and second inertia members 206, 208. The spring damper material 212 may be seated within the annular channel 252 and compressed between the first and second inertia members 206, 208.

The spring damper material 212 is an annular body at least partially seated in the annular channel 252 and extending inward from the annular channel 252, through the radially facing open side 254, and into contact with the exterior surface 203 of the shaft 204. At least a portion of the spring damper material 212 may be disposed within the annular channel 252 and is positioned to place a compressible portion 214 of the spring damper material 212 closer to the central longitudinal axis A' than the inner radial surfaces 246 of the first and second inertia members 206, 208 such that the compressible portion 214 is in contact with the exterior surface 203 of the shaft 204. The annular body of the spring damper material 212 also includes a first rib 216 protruding therefrom compressed by contact with the first inertia member 206 and a second rib 218 protruding therefrom compressed by contact with the second inertia member 218. The spring damper material 212 is secured in the annular channel 252 through compression of the first rib 216 and second rib 218 by the first inertia member 206 and second inertia member 208, respectively.

As represented by the dashed lines in FIG. 4, the annular body of the spring damper material 212 includes a main body 220 between the first rib 216 and the second rib 218 that includes a stiffness portion 222, which is more proximate an outer radial surface 225 of the spring damper material 212, and the compressible portion 226, which is positioned more proximate the shaft 204. The stiffness portion 222 enables the compressible portion 226 to be compressed against the exterior surface 203 of the shaft 204 (FIG. 1) for a press-fit. More particularly, the stiffness portion 222 provides a hydrostatic radial force to define a joint 230 between an inner radial surface 224 of the compressible portion 226 and the exterior surface 203 of the shaft 204, and the compressible portion 226 has a coefficient of friction, which combined hold the radial vibration damper 202 in place on the exterior surface 203 of the shaft 204 without axial movement (creep). The inner diameters of the first and second inertia members 206, 208 are generally greater than a diameter of the exterior surface 203 of the shaft 204 such that when radial vibration damper 202 is press fit to the exterior surface 203 of the shaft 204, which compresses the compressible portion 226 against the exterior surface 203 of the shaft 204, the spring damper material 212 defines a gap 228 between the first and second inertia members 206, 208 and the exterior surface 203 of the shaft 204. This gap 228 allows some amount of movement of the first and second inertia members 206, 208 relative to the rotation of the shaft 204.

As seen in FIG. 4, the spring damper material 212 may be a monolithic body, may be made up of multiple parts, or may have any shape previously described above in relation to FIGS. 1-2. Additionally, the spring damper material 212—including the compressible portion 226, the stiffness portion 222, and the ribs 216, 218—may be made of any of the aforementioned materials described in relation to FIGS. 1-2. The stiffness portion of the spring damper material 212 may be or include one or more of the materials listed above for the compressible portion 226 and/or the ribs 216, 218, but have a higher modulus than the material selected for at least one of the first and second ribs 216, 218 and the compressible portion 226.

As seen in FIG. 4, fasteners 210 may be used to fixedly connect the first inertia member 206 to the second inertia member 208 (and vice versa). The fasteners 210 may be bolts, screws, rivets, or the like. As shown in FIG. 4, the fasteners 210 may be bolts having a first shoulder 270 seated against a stop 272 in the first inertia member 206. The second inertia member 208 may have a threaded bore 276 to receive a threaded end of the fastener 210. In one embodiment, the fasteners 210 may be shoulder bolts (not shown) having a first shoulder and a second shoulder such that an amount of axial compression on the spring damper material 212 is limited by the distance between the first shoulder and the second shoulder, as described in conjunction with the embodiments depicted in FIGS. 1-2. The fasteners 210 may be such that a head portion, if present, is counter-bored into one of the first or second inertia members 206, 208. The fasteners 210 may be distributed radially to maintain a balanced rotating system.

In the embodiment of FIG. 4, rather than having the fastener 210 control the distance defining the axial compression of the spring damper material 212, the first and second inertia members 206, 208 may define an axial dimension of the annular channel 252, which defines the axial compression of the spring damper material 212. The first inertia member 206 or the second inertia member 208 may abut as shown in FIG. 4 or may have arms (not shown) extending toward the other inertia member 206, 208 to define the axial compression of the spring damper material 212. In one embodiment, the first inertia member 206 and the second inertia member 208 both have arms (not shown) extending toward the other inertia member to define the axial compression of the spring damper material 212. In another embodiment, the arms of one of the first and second inertia members 206, 208 may terminate in a male member and the arms of the other one of the first and second inertia members 206, 208 may terminate in a female member, such that the male member and female member are mateable to create a secure press fit, which may eliminate the need for fasteners 210 to couple together the first and second inertia members 206, 208.

Referring to FIG. 4, the first and second inertia members 206, 208 may be made from any material having a sufficient mass, usually a cast iron metal, and may be cast, spun, forged, machined, or molded using known or hereinafter developed techniques. The first and second inertia members 206, 208 may include a groove 234 shaped and sized to receive the first rib 216 and the second rib 218, respectively therein. The groove 234 may be disposed in the inner axial faces 248 of the first and second inertia members 206, 208. Since the first and second ribs 216, 218 are annular rings disposed about the central longitudinal axis A', the grooves 234 are likewise annular rings disposed about the central longitudinal axis A'. The first rib 216 and the second rib 218 may be continuous or discontinuous rings and likewise the grooves 234 may be continuous or discontinuous rings. The grooves 234 act to position the spring damper material 212 in a predetermined position determined to be appropriate to form the joint 230 (FIG. 4). In another embodiment, in addition to the grooves 234 or as an alternative to the grooves 234, the first inertia member 206 and/or the second inertia member 208 may include an alignment fixture (not shown) that protrudes therefrom toward the spring damper material 212 and at least a portion of the alignment fixture is juxtaposed to the spring damper material 212 or could be inserted into the spring damper material 212 (not shown).

The radial vibration damper 202 may be tuned by changing the mass of the first and second inertia members 206, 208, by changing the geometry of the first and second ribs 216, 218 individually or collectively, changing the thickness of stiffness portion 222, changing the compressible nature of the first and second ribs 216, 218 and/or the compressible portion 226, and/or changing the distance of separation between the first and second inertia members 206, 208 thereby changing the axial compression of the spring damper material.

Radial vibration damper 202 disposed on the exterior surface 203 of the shaft 204 provides easier access to the radial vibration damper 202 for tuning and service. In addition, the external radial vibration damper 202 allows for easy addition of more weight to the first and second inertia members 206, 208, as well as the same advantages pointed out above for the embodiments described with reference to FIGS. 1-2.

Although the invention is shown and described with respect to certain embodiments, it is obvious that modifications will occur to those skilled in the art upon reading and understanding the specification, and the present invention includes all such modifications.

What is claimed is:

1. A radial vibration damper comprising:
   a first inertia member and a second inertia member fixedly connected to one another to define an annular channel having a radially facing, open side;
   a spring damper material seated in the annular channel in axial compression between the first inertia member and the second inertia member;
   wherein the spring damper material has a compressible portion thereof protruding from the annular channel through the radially facing, open side and the compressible portion is exposed for contact in radial compression against a shaft;
   wherein the compressible portion exposed for contact in radial compression against the shaft defines a gap separating the shaft a distance apart from the first and second inertia members.

2. The radial vibration damper of claim 1, further comprising a fastener connecting the first inertia member to the second inertia member.

3. The radial vibration damper of claim 1, wherein the spring damper material includes a first rib protruding therefrom compressed by contact with the first inertia member and a second rib protruding therefrom compressed by contact with the second inertia member.

4. The radial vibration damper of claim 3, wherein the first inertia member and the second inertia member each include a groove shaped and sized to receive the first rib and the second rib, respectively, of the spring damper material.

5. The radial vibration damper of claim 3, wherein the spring damper material includes a main body between the first rib and the second rib that includes a stiffness portion and the compressible portion, wherein the compressible portion is more proximal to the radially facing, open side of the annular channel than the stiffness portion, and the stiffness portion has a higher modulus than the compressible portion.

6. The radial vibration damper of claim 5, wherein the spring damper material includes a compressible material in at least the first rib, the second rib, and the compressible portion.

7. The radial vibration damper of claim 6, wherein the compressible material includes one or more of an elastomeric material, a hyperfoam material, and a nylon.

8. The radial vibration damper of claim 7, wherein the stiffness portion includes one or more of the same materials as the compressible portion.

9. The radial vibration damper of claim 5, wherein the spring damper material is a monolithic body.

10. The radial vibration damper of claim 1, wherein the first inertia member and the second inertia member each include an alignment fixture to hold the spring damper material in its position.

11. The radial vibration damper of claim 1, wherein the spring damper material comprises a main body defined by a first ring of a compressible material in contact with a surface of the shaft and a second ring of a stiffness material seated adjacent to the first ring, a third ring compressed between the main body and the first inertia member, and a fourth ring compressed between the main body and the second inertia member.

12. The radial vibration damper of claim 1, wherein finite element modeling demonstrates that the radial vibration damper has a first mode of vibration that is radial in shape.

13. The radial vibration damper of claim 12, wherein finite element modeling demonstrates that the radial vibration damper has a second mode of vibration that is axial.

14. The radial vibration damper of claim 1, wherein the shaft is hollow and the radial vibration damper is press-fittable inside the shaft with the compressible portion of the spring damper material compressed against an inner surface of the shaft.

15. The radial vibration damper of claim 1, wherein the radial vibration damper is press-fittable over the shaft with the compressible portion of the spring damper material compressed against an exterior surface of the shaft.

16. A system comprising a shaft having press-fit thereto a radial vibration damper according to claim 1.

17. A radial vibration damper comprising:
    a first inertia member and a second inertia member fixedly connected to one another to define an annular channel having a radially facing, open side;
    a spring damper material seated in the annular channel in axial compression between the first inertia member and the second inertia member;
    wherein the spring damper material has a compressible portion thereof protruding from the annular channel through the radially facing, open side and the compressible portion is exposed for contact in radial compression against a shaft, the spring damper material defines a gap between the shaft and the first and second inertia members;
    wherein the spring damper material includes a first rib protruding therefrom compressed by contact with the first inertia member and a second rib protruding therefrom compressed by contact with the second inertia member, and includes a main body between the first rib and the second rib that includes a stiffness portion and the compressible portion;
    wherein the compressible portion is more proximal to the radially facing, open side of the annular channel, and the stiffness portion is stiffer than the compressible portion.

18. The radial vibration damper of claim 17, wherein the spring damper material includes a compressible material in at least the first rib, the second rib, and the compressible portion.

19. The radial vibration damper of claim 17, wherein the spring damper material is a monolithic body.

20. A radial vibration damper comprising:
    a first inertia member and a second inertia member fixedly connected to one another to define an annular channel having a radially facing, open side;
    a spring damper material seated in the annular channel in axial compression between the first inertia member and the second inertia member;
    wherein the spring damper material has a compressible portion thereof protruding from the annular channel through the radially facing, open side and the compressible portion is exposed for contact in radial compression against a shaft, the spring damper material defines a gap between the shaft and the first and second inertia members;

wherein the spring damper material comprises a main body defined by a first ring of a compressible material in contact with a surface of the shaft and a second ring of a stiffness material seated adjacent to the first ring, a third ring compressed between the main body and the first inertia member, and a fourth ring compressed between the main body and the second inertia member.

\* \* \* \* \*